United States Patent
Eilerts et al.

(10) Patent No.: US 6,821,920 B2
(45) Date of Patent: Nov. 23, 2004

(54) POLYMERIZATION CATALYSTS AND PROCESSES THEREFOR

(75) Inventors: Nancy W. Eilerts, Bartlesville, OK (US); Gil R. Hawley, Dewey, OK (US)

(73) Assignee: Phillips Petroleum Company, Bartlesville, OK (US)

( * ) Notice: Subject to any disclaimer, the term of this patent is extended or adjusted under 35 U.S.C. 154(b) by 0 days.

(21) Appl. No.: 10/351,338

(22) Filed: Jan. 27, 2003

(65) Prior Publication Data

US 2003/0134996 A1 Jul. 17, 2003

Related U.S. Application Data

(62) Division of application No. 09/933,357, filed on Aug. 20, 2001, now Pat. No. 6,521,727, which is a continuation of application No. 08/994,490, filed on Dec. 19, 1997, now abandoned.

(51) Int. Cl.$^7$ ................................................ C08F 4/70
(52) U.S. Cl. ...................... 502/117; 502/155; 502/161; 502/167; 526/161
(58) Field of Search ................................ 502/117, 155, 502/161; 526/161

(56) References Cited

U.S. PATENT DOCUMENTS

| | | |
|---|---|---|
| 3,248,179 A | 4/1966 | Norwood |
| 3,592,870 A | 7/1971 | Dunn |
| 3,949,013 A | 4/1976 | Yoo et al. |
| 5,412,046 A | 5/1995 | Yano et al. |
| 5,461,126 A | 10/1995 | Knudsen et al. |
| 5,492,983 A | 2/1996 | Olonde et al. |
| 5,844,055 A | 12/1998 | Brandt et al. |
| 5,852,145 A | * 12/1998 | McLain et al. .............. 526/133 |
| 5,866,663 A | 2/1999 | Brookhart et al. |
| 6,291,608 B1 | 9/2001 | Eilerts et al. |
| 6,479,422 B1 | * 11/2002 | Eilerts ........................ 502/117 |

FOREIGN PATENT DOCUMENTS

WO   WO 96/23010   8/1996

OTHER PUBLICATIONS

J. Am. Chem. Soc., (Brookhart et al., 1995), vol. 117, pp. 6414–6415.

Macromol. Rapid Commun., (Pellecchia et al., 1996), vol. 17, pp. 333–338.

Polymer Preprints, (Brookhart et al., Mar. 1996), vol. 37, No. 1, 254–255.

Z. Naturforsch B: Anorg. Chem. Organ. Chem., (Dieck et al.), vol. 36b, pp. 823–832, 1981.

Inorganic Chemistry, (Bullen, G.J., Mason, R., and Pauling, P.), vol. 4, pp. 456–462, 1965.

Zeng, Xlaofeng et al., *Ni(acac)$_2$–DAD/MAO: A New Catalytic System for Ethylene Polymerization*, Macromol. Chem Phys., vol. 199, pp. 2677–2681, 1998.

* cited by examiner

*Primary Examiner*—Roberto Rabago
(74) *Attorney, Agent, or Firm*—Womble Carlyle Sandridge & Rice PLLC

(57) ABSTRACT

Novel catalyst systems which comprise diimine nickel complexes comprising additional ligands selected from the group consisting of acetylacetonate, hexaflourylacetylacetonate, halogens and mixtures thereof can be used with methylaluminoxane in slurry polymerization processes to polymerize mono-1-olefins and, optionally one or more higher mono-1-olefin comonomer(s), to produce high molecular weight polymers.

17 Claims, No Drawings

POLYMERIZATION CATALYSTS AND PROCESSES THEREFOR

This application is a divisional of U.S. patent application Ser. No. 09/933,357, filed Aug. 20, 2001, now U.S. Pat. No. 6,521,727 B2, which is a continuation of U.S. patent application Ser. No. 08/994,490, filed Dec. 19, 1997, now abandoned.

BACKGROUND

This invention relates to homopolymerization of mono-1-olefin monomers, such as ethylene and propylene, and copolymerization of a mono-1-olefin monomers, such as ethylene and propylene, with at least one higher alpha-olefin comonomer.

It is well known that mono-1-olefins, such as ethylene and propylene, can be polymerized with catalyst systems employing transition metals such as titanium, vanadium, chromium, nickel and/or other metals, either unsupported or on a support such as alumina, silica, titania, and other refractory metals. Supported polymerization catalyst systems frequently are used with a cocatalyst, such as alkyl boron and/or alkyl aluminum compounds. Organometallic catalyst systems, i.e., Ziegler-Natta-type catalyst systems usually are unsupported and frequently are used with a cocatalyst, such as methylaluminoxane.

It is also well-known that, while no polymer production process is easy, slurry, or loop, polymerization processes are relatively much more commercially desirable than other polymerization processes. Furthermore, the type of polymerization process used can have an effect on the resultant polymer. For example, higher reactor temperatures can result in low catalyst activity and productivity, as well as a lower molecular weight polymer product. Higher reactor pressures also can decrease the amount of desirable branching in the resultant polymer.

Most polymer products made in slurry processes, especially those polymer products made using supported chromium catalyst systems, have a broader molecular weight distribution and, therefore, the polymer product is much easier to process into a final product. Polymers made by other processes, such as, for example, higher temperature and/or higher pressure solution processes, can produce polymers having a narrow molecular weight distribution; these polymers can be much more difficult to process into an article of manufacture.

Unfortunately, many homogeneous organometallic catalyst systems have low activity, high consumption of very costly cocatalysts, like methylaluminoxane (MAO), and can produce low molecular weight polymers with a narrow molecular weight distribution. Furthermore, even though MAO can be necessary to produce a polymer with desired characteristics, an excess of MAO can result in decreased catalyst system activity. Additionally, these types of homogeneous catalyst systems preferably are used only in solution or gas phase polymerization processes.

SUMMARY OF THE INVENTION

It is an object of this invention to provide novel catalyst systems useful for polymerization.

It is another object of this invention to provide catalyst systems which are relatively simple to make, have increased activity and increased productivity.

It is a further object of this invention to provide catalyst systems which have reduced cocatalyst consumption.

It is still another object of this invention to provide an improved polymerization process.

It is yet another object of this invention to provide homopolymers of mono-1-olefins and copolymers of at least two different mono-1-olefin(s) that can be processed easily, as indicated by increased branching and a broad molecular weight distribution.

It is still another object of this invention to provide homopolymers of mono-1-olefins and copolymers of at least two different mono-1-olefin(s) that have an increased molecular weight.

In accordance with this invention heterogeneous catalyst systems comprising diimine nickel complexes which further comprise additional ligands selected from the group consisting of α-deprotonated-β-diketones, α-deprotonated-β-ketoesters, halogens and mixtures thereof having a formula selected from the group consisting of $Ni(NCR'C_6R_2H_3)_2(Y_2C_3R''_2X)_2$ and $Ni(NCR'C_6R_2H_3)_2(Y_2C_3R''_2X)Z$ and methylaluminoxane are provided. Processes to make these catalyst systems also are provided.

In accordance with another embodiment of this invention, slurry polymerization processes comprising contacting ethylene, and optionally one or more higher alpha-olefins, in a reaction zone with heterogeneous catalyst systems comprising diimine nickel complexes which further comprise additional ligands selected from the group consisting of α-deprotonated-β-diketones, α-deprotonated-β-ketoesters, halogens and mixtures thereof in the presence of methylaluminoxane are provided.

In accordance with this invention heterogeneous catalyst systems consisting essentially of diimine nickel complexes which further comprise additional ligands selected from the group consisting of (α-deprotonated-β-diketones, α-deprotonated-β-ketoesters, halogens and mixtures thereof and methylaluminoxane are provided. Processes to make these catalyst systems also are provided.

In accordance with another embodiment of this invention, slurry polymerization processes consisting essentially of contacting ethylene, and optionally one or more higher alpha-olefins, in a reaction zone with heterogeneous catalyst systems comprising diimine nickel complexes which further comprise additional ligands selected from the group consisting of α-deprotonated-β-diketones, α-deprotonated-β-ketoesters, halogens and mixtures thereof in the presence of methylaluminoxane are provided.

In accordance with yet another embodiment of this invention, compositions comprising homopolymers of ethylene and copolymers of ethylene and one or more higher alpha-olefins which can be characterized as having high molecular weight, increased branching and a broad molecular weight distribution, are provided.

DESCRIPTION OF THE PREFERRED EMBODIMENTS

Catalyst Systems

Catalyst systems of this invention can be characterized as diimine nickel complexes comprising additional ligands selected from the group consisting of β-diketonates, halogens and mixtures thereof having a formula selected from the group consisting of $Ni(NCR'C_6R_2H_3)_2(Y_2C_3R''_2X)_2$ and $Ni(NCR'C_6R_2H_3)_2(Y_2C_3R''_2X)Z$ and also represented by general structural formulas as shown below in Compounds I and II, Compound I

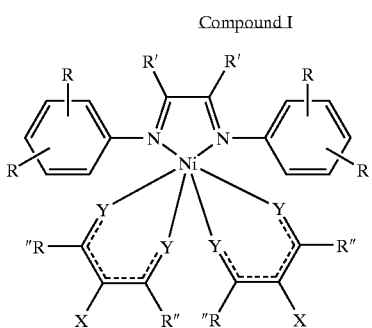

Compound II

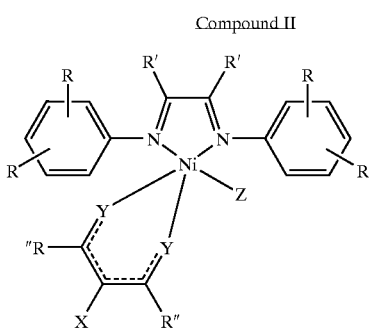

wherein R can be the same or different and is selected from the group consisting of branched or linear alkyl or aromatic groups having from about 1 to about 10, preferably from about 1 to about 8, carbon atoms per alkyl group and R can be in any position on the aromatic ring; and R' can be the same or different and is selected from the group consisting of hydrogen and linear, branched, cyclic, bridging, aromatic, and/or aliphatic hydrocarbons, having from about 1 to about 70, preferably from about 1 to about 20, carbon atoms per radical group.

R substituents on the aromatic rings of the diimine nickel complex can be the same or different, and are selected from the group consisting of branched or linear alkyl (aliphatic) or aromatic groups having from about 1 to about 10, preferably from about 1 to about 8, carbon atoms per alkyl group. Although hydrogen can be used, hydrogen can inhibit synthesis of the ligand. R groups having more than about 8 carbon atoms per group can result in a catalyst system with lower activity and/or productivity. While not wishing to be bound by theory, it is believed that larger substituent groups can cause steric hindrance in the catalyst system, thereby which can decrease catalyst system activity and/or productivity and/or ease of synthesis of the catalyst. Exemplary alkyl substituents are selected from the group consisting of methyl, ethyl, propyl, isopropyl, butyl, isobutyl, tert-butyl, benzyl, phenyl groups, and mixtures of two or more thereof. Preferably, the R substituent is an electron-donating species, selected from the group consisting of linear or branched aliphatic groups having from about 1 to about 5 carbon atoms per group. Most preferably, the R groups are both the same and are selected from the group consisting of methyl and isopropyl, due to commercial availability and ease of synthesis of the ligand.

The R group can be in any position, i.e., from 2 to 6, on the aromatic ring. Preferably, the R group, which can be the same or different, is either in the 2 or 6 position, due to ease of synthesis. Most preferably, for best catalytic activity and productivity, both R groups are the same and are in the 2 and 6 positions on the aromatic ring.

R' substituents can be the same or different and are selected from the group consisting of hydrogen and branched, linear, cyclic, aromatic or aliphatic radicals having from about 1 to about 70 carbon atoms per radical. Further, the R' substituents can be linked, or joined, across the carbon-carbon bridge between the two nitrogen atoms. While not wishing to be bound by theory, it is believed that radicals having more than 70 carbon atoms can add to the steric hindrance of the catalyst systems and hinder catalyst synthesis and/or activity and productivity. Preferably, the R' substituent group is selected from the group consisting of hydrogen and branched, linear, cyclic, aromatic or aliphatic radicals having from about 1 to about 20 carbon atoms per radical, due to commercial availability and ease of synthesis of the ligand. Most preferably, the R' substituent groups are the same or a link across the carbon-carbon bridge between the nitrogen atoms, and the R' substituent is selected from the group consisting of hydrogen and branched, linear, cyclic, aromatic or aliphatic radicals having from about 1 to about 12 carbon atoms per radical, for the reasons given above. Exemplary R' substituents include, but are not limited to, hydrogen, methyl, ethyl, propyl, phenyl, taken together acenaphthyl or cyclobutadienyl. Preferably, the R' substituents are identical and are selected from the group consisting of hydrogen, methyl and acenaphthyl for best resultant catalyst system activity and productivity.

R"CYCXCYR" substituents, or ligands, in which R" can be the same or different, on the diimine nickel complex can be the same or different and are selected from the group consisting of α-deprotonated-β-diketones, α-deprotonated-β-ketoesters, halogens and mixtures thereof. The α-deprotonated-β-diketones and α-deprotonated-β-ketoesters can be derived from β-diketone and β-ketoester ligand precursors. R" and X can be the same or different and are selected from the group consisting of hydrogen and linear, branched, cyclic, bridging, aromatic, aliphatic hydrocarbons, and mixtures thereof having from about 1 to about 70 carbon atoms per radical group, optionally containing atoms other than carbon and hydrogen; and wherein Y and be the same or different and is selected from the group consisting of oxygen, sulfur, or selenium. Further, wherein one R" and X are selected from the group consisting of hydrogen and linear, branched, cyclic, bridging, aromatic, aliphatic hydrocarbon radicals, and mixtures thereof having from about 1 to about 70 carbon atoms per radical group, optionally containing atoms other than carbon and hydrogen and wherein the other R" is selected from the group consisting of alkoxides of linear, branched, cyclic, bridging, aromatic, and aliphatic hydrocarbon radicals, and mixtures thereof having from about 1 to about 70 carbon atoms per radical group, optionally containing atoms other than carbon and hydrogen. Exemplary ligands precursors include, but are not limited to, compounds selected from the group consisting of 2,4-pentanedione, 1,1,1,5,5,5-hexafluoro-2,4-pentanedione, allylacetonacetate, benzoylacetonate, benzoyl-1,1,1-trifluoroacetone, 1,1,1-trifluoro-2,4-pentanedione, 1-chloro-1,1-difluoroacetylacetone methyl-4,4,4-trifluoroacetoacetate, 1,1,1-trifluoro-5,5-dimethyl-2,4-pentanedione, ethyl α-methyl-4,4,4-trifluoroacetoacetate, 4,4,4-trifluoro-1-(2-furyl)-1,3-butanedione, and 2,2-dimethyl-6,6,7,7,8,8,8-heptafluoro-3,5-octanedione. Preferably, ligand precursors are selected from the group consisting of 2,4-pentanedione,1,1,1,5,5,5-hexafluoro-2,4-pentanedione, 1,1,1 -trifluoro-2,4-pentanedione, 1-chloro-1, 1-difluoroacetylacetone, methyltrifluoroacetoacetate, 1,1,1-trifluoro-5,5-dimethyl-2,4-pentanedione, and ethyl α-methyl-4,4,4-trifluoroacetoacetate. Most preferably, ligands include, but are not limited to 2,4-pentanedione, 1,1,1,5,5,5-hexafluoro-2,4-pentanedione, 1,1,1-trifluoro-2,4-pentanedione, 1-chloro-1,1-difluoroacetylacetone, and 1,1,1-trifluoro-5,5-dimethyl-2,4-pentanedione for best catalyst system activity as well as best polymer product properties.

The group Z, i.e., halogen, of the diimine nickel complex is selected from the group consisting of fluorine, chlorine, bromine and/or iodine. Preferably, the halogen is selected from the group consisting of chlorine and/or bromine for high catalyst activity and productivity. Most preferably, the halogen is chlorine for best catalyst system activity and productivity.

The diimine nickel complex catalyst system disclosed in this application can be prepared by any method known in the art. For example, approximate molar equivalents of a diimine ligand and a nickel compound can be contacted in the presence of any compound that can dissolve both the diimine ligand and nickel compound, either partially or completely. The contacting conditions can be any conditions suitable to effect the formation of a diimine nickel complex. Preferably, for best product results, the diimine ligand/nickel complex mixture is contacted at room temperature under a dry atmosphere for any amount of time sufficient to form the diimine nickel complex. Completion of the—formation of the diimine nickel complex can be evidenced by a color change. Generally, contacting times of about 8, and preferably 12 hours are sufficient. Usually, as a result of the preparation procedure, the resultant diimine nickel complex will comprise from about 3 to about 20, preferably from about 5 to about 15, weight percent nickel, based on the total mass of the diimine nickel complex. The presence of oxygen is not thought to be detrimental to this aspect of the preparation procedure.

In general, diimine ligands are contacted with a nickel β-diketonate or nickel β-diketonate halide to form diimine nickel complexes. Typical syntheses of nickel complexes related to those described in this invention can be found in Dieck, H., Svboda, M., and Greiser, T., *Z. Naturforsch B: Anorg. Chem. Organ. Chem.*, Vol. 36b, pp. 823–832 (1981), herein incorporated by reference. Usually for ease of catalyst system preparation, the diimine ligand is prepared first. The catalyst preparation procedure can vary, depending on the substituents on the diimine ligand. For example, to prepare a specific diimine ligand, wherein R' is hydrogen, a three-component mixture is prepared. A two-fold molar excess of aniline, containing the desired R substituents ($R_nC_6H_{7-n}$)N, wherein n=1,2), is contacted with a dialdehyde, such as, for example, glyoxal (CHOCHO), in the presence of a compound capable of being a solvent for both organic and aqueous compounds. Exemplary solvents for both organic and aqueous compounds include, but are not limited to, methanol, ethanol and/or tetrahydrofuran (THF). The mixture can be contacted, preferably refluxed, under any atmosphere to form the desired ligand. Preferably, the mixture is refluxed for at least 10, preferably 20 minutes, cooled and the desired ligand can be recovered. Generally, after refluxing and cooling, the ligand can be recovered in a crystalline form.

To prepare another specific diimine ligand wherein the R' group is anything other than hydrogen, a similar procedure can be used. For example, at least a two-fold molar excess of aniline or a substituted aniline can be combined with a compound capable of dissolving both organic and aqueous compounds and a very minor amount of formic acid. Then, about a one molar equivalent of an alpha-diketone (R'COCOR') can be added to the mixture. The mixture can be stirred, under atmospheric conditions of temperature and pressure until the reaction is complete and the desired ligand is formed. Preferably, water is absent from the reaction mixture. Generally, the reaction will be complete in about 18, preferably 24 hours. A crystalline ligand product can be recovered according to any method known in the art.

The nickel bis(β-diketonate), nickel bis(β-ketoester), nickel β-diketonate halide and nickel β-ketoester halide can be prepared by any method known in the art. Typical syntheses of such nickel complexes can be found in Bullen, G. J., Mason, R., and Pauling, P., *Inorganic Chemistry*, Vol. 4, pp. 456–462 (1965), herein incorporated by reference. Alternatively, and especially in the case of nickel β-diketonate halides and nickel β-ketoester halides, the salt of the β-diketone or β-ketoester can be prepared then reacted with the correct quantity of nickel halide. A mixture of an appropriate Brönsted base, such as but not limited to sodium or potassium hydride or sodium or potassium methoxide, is mixed with a solvent capable of dissolving or becoming miscible with the β-diketone or β-ketoester. Exemplary solvents include toluene, benzene, methanol, or ethanol. One molar equivalent of the β-diketone or β-ketoester is added slowly to this mixture. Reaction is known to occur as evidenced by the evolution of heat and a change in the physical appearance of the mixture. Once all reactants have contacted, reaction times from 4 to 12 hours are sufficient to ensure complete reaction. If the product salt of the β-diketone or β-ketoester is not soluble in the solvent chosen, the solvent is removed by filtration or vacuum and the salt dissolved in a solvent in which it is soluble. Exemplary solvents include methanol and ethanol. This solution is then added to a one half molar equivalent of nickel halide that has been suspended or dissolved in the same solvent or a solvent with which the first solvent is miscible. The preceding reactant ratio results in the formation of the nickel bis(β-diketonate) or nickel bis(β-ketoester). If the nickel β-diketonate halide or nickel β-ketoester halide are desired, the solution is added to one molar equivalent of nickel halide as described. Reaction is known to occur as evidenced by the formation of a soluble green species. Reaction times of 4 to 12 hours are sufficient to ensure complete reaction. The byproduct sodium or potassium halide salt is then removed from the reaction product by filtration and/or centrifugation. The solvent is removed by vacuum to yield the nickel complex used in the nickel diimine complex synthesis.

After formation of a diimine nickel complex, the diimine nickel complex can be recovered by any method known in the art, such as, for example evaporation and/or vacuum filtration of the solvent. Further, if desired, the diimine nickel complex can be further purified by washing. One exemplary wash compound can be heptane. The diimine nickel complex catalyst system can be recovered and used as a solid, heterogeneous catalyst system.

Reactants, Polymerization and Polymer Products

Polymers produced according to the process of this invention can be homopolymers of mono-1-olefins or copolymers of at least two different mono-1-olefins. Exemplary mono-1-olefins useful in the practice of this invention include, but are not limited to mono-1-olefins having from about 2 to about 10 carbon atoms per molecule. Preferred mono-1-olefins include, but are not limited to ethylene, propylene, 1-butene, 1-pentene, 1-hexene, 1-heptene, 3-methyl-1- butene, 4-methyl-1-pentene, 1-octene, 1-nonene and 1-decene. If the reaction product is a copolymer, one mono-1-olefin monomer can be polymerized with a mono-1-olefin comonomer which is a different alpha-olefin, usually having from about 3 to about 10, preferably from 3 to 8 carbon atoms per molecule. Exemplary comonomers include, but are not limited to, propylene, 1-butene, butadiene, 1-pentene, 1-hexene, 1-octene, 4-methyl-1-pentene, and mixtures thereof. Preferably, if the monomer is ethylene, the comonomer is 1-hexene and/or 4-methyl-1-pentene, in order to achieve maximum polymer product toughness. Preferably, if the monomer is propylene, the comonomer is ethylene and/or butadiene in order to achieve maximum polymer product toughness and clarity.

If a comonomer is used, the comonomer can be added to the polymerization reactor, or reaction zone, in an amount within a range of about 1 to about 20 weight percent, preferably within 7 to about 18 weight percent, based on the weight of the ethylene monomer. Most preferably, a comonomer is present in the reaction zone within a range of about 10 to about 16 weight percent, in order to produce a polymer having the most desired physical properties.

Polymerization of the monomer and optional comonomer must be carried out under slurry, also known as loop/slurry or particle form, polymerization conditions wherein the temperature is kept below the temperature at which polymer swells significantly. Slurry polymerization processes are much easier to operate and maintain than other polymerization processes; a polymer product produced by a slurry process can be recovered much more easily. Such polymerization techniques are well-known in the art and are disclosed, for instance, in Norwood, U.S. Pat. No. 3,248,179, the disclosure of which is hereby incorporated by reference.

The slurry process generally is carried out in an inert diluent (medium), such as, for example, a paraffin, cycloparaffin, and/or aromatic hydrocarbon. Preferably, the inert diluent is an alkane having less that about 12 carbon atoms per molecule, for best reactor operation and polymer product. Exemplary diluents include, but are not limited to propane, n-butane, isobutane, n-pentane, 2-methylbutane (isopentane), and mixtures thereof. Isobutane is the most preferred diluent due to low cost and ease of use.

The temperature of the polymerization reactor, or reaction zone, when using isobutane as the reactor diluent, according to this invention, is critical and must be kept within a range of about 5° to about 100° C. (41°–212° F.) and preferably within a range of about 10° to about 70° C. (50°–158° F.). Most preferably, the reaction zone temperature is within a range of 20° to 60° C. (68°–140° F.) for best catalyst activity and productivity. Reaction temperatures below about 10° C. can be ineffective for polymerization.

Pressures in the slurry process can vary from about 100 to about 1000 psia (0.76–7.6 MPa), preferably from about 200 to about 700 psia. Most preferably, the reaction zone is maintained at a pressure within a range of 300 to 600 psia for best reactor operating parameters and best resultant polymer product. The catalyst system is kept in suspension and is contacted with the monomer and comonomer(s) at sufficient pressure to maintain the medium and at least a portion of the monomer and comonomer(s) in the liquid phase. The medium and temperature are thus selected such that the polymer or copolymer is produced as solid particles and is recovered in that form. Catalyst system concentrations in the reactor can be such that the catalyst system content ranges from 0.001 to about 1 weight percent based on the weight of the reactor contents.

The catalyst system and methylaluminoxane (MAO) can be added to the reactor in any order to effect polymerization. For example, catalyst system can be added, then some reactor diluent, such as isobutane, followed by MAO, then more diluent and finally, monomer and optional comonomer. However, as stated earlier, this addition order can be varied, depending on equipment availability and/or desired polymer product properties. Preferably, the catalyst system and MAO are not precontacted prior to addition to the polymerization reactor due to a possible decrease in catalyst activity.

The amount of catalyst system and MAO added to the reactor can vary. Generally, a molar excess of MAO is present, relative to the diimine nickel complex. Preferably, the aluminum to nickel (Al:Ni) molar ratio is less than about 1500:1, more preferably within a range of about 50:1 to about 600:1. Most preferably, the molar ratio of aluminum to nickel is within a ratio of 100:1 to 400:1 for best catalyst system activity and productivity.

Two preferred polymerization methods for the slurry process are those employing a loop reactor of the type disclosed in Norwood and those utilizing a plurality of stirred reactors either in series, parallel or combinations thereof wherein the reaction conditions can be the same or different in the different reactors. For instance, in a series of reactors, a chromium catalyst system which has not been subjected to the reduction step can be utilized either before or after the reactor utilizing the catalyst system of this invention.

Polymers produced in accordance with this invention generally have a relatively narrow heterogeneity index (HI), which is a ratio of the weight average molecular weight ($M_w$) and the number average molecular weight ($M_n$) (also expressed as $M_w/M_n$). Polymers produced in accordance with this invention usually have a HI within a range of about 3 to about 10, preferably within a range of about 3 to about 6, for best indication of processability.

Polymers produced in accordance with this invention are very unique because of a significant amount of short chain branching which can be produced even in the absence of a comonomer added to the reactor. This short chain branching is evidence that some sort of comonomers are produced in-situ in the reactor and are incorporated into the polymer and/or that the catalyst can form short chain branches by rearrangement of the main polymer chain through successive hydride elimination, olefin rotation, and hydride re-addition reactions. This series of steps may not involve discrete intermediates and may rather be a concerted or continuous series of reactions with no distinct intermediates formed. Such rearrangements can be termed "chain walking". Chain walking can be described by the active metal catalyst, i.e. nickel, "walking" a distance along the polymer backbone during polymerization and hence, the short chain branch length can be dictated by the rate of ethylene insertion relative to the combined rates of hydride elimination, olefin rotation, and hydride re-addition. Usually polymers produced in accordance with this invention, wherein no comonomer is added to the polymerization reactor comprise up to about 3000, and generally from about 20 to about 3000 short chain branches per 10,000 (or from about 2 to about 300 short chain branches per 1000) backbone carbon atoms of the polymer. Furthermore, the short chain branches produced comprise both odd and even carbon branches, i.e., branches comprising an odd number of carbon atoms per short chain branch, as well as branches comprising an even number of carbon atoms per short chain branch.

If desired, optional addition of one or more comonomers can be added to the polymerization reactor. The affirmatively added comonomers can further increase the amount of short chain branching in the resultant polymer, or copolymer. Polymers produced with the addition of a comonomer can have a greater number of short chain branches in addition to those generated as described above. If a comonomer is affirmatively added to the polymerization reactor, these polymers usually can comprise up to about 3500, and generally from about 20 to about 3500, short chain branches per 10,000 backbone carbon atoms of polymer.

A further understanding of the invention and its advantages is provided by the following examples.

EXAMPLES

The following Examples illustrate various aspects of the invention. Data are included for each example about polymerization conditions, as well as the resultant polymer. All chemical handling, including reactions, preparation and storage, was performed under a dry, inert atmosphere (usually nitrogen). Unless otherwise indicated, bench scale polymerizations were completed in a 2.6 liter autoclave reactor at the desired temperature using an isobutane (1.2 liter) slurry. The reactor was heated to 120° C. and purged with nitrogen for about 20 minutes. The reactor then was cooled to the desired polymerization temperature and pressurized with isobutane to about 400 psig. A known quantity (mass) of diimine nickel complex catalyst was charged to the reactor against a countercurrent of isobutane and the agitator was set at 490 rpm. If hydrogen was charged to the reactor, hydrogen addition was followed by isobutane. The desired quantity of methylaluminoxane (MAO) (10 weight % in toluene) was charged directly to the reactor via syringe. After the full volume of isobutane was added, ethylene was added to bring the total reactor pressure to 550 psig. Ethylene was fed on demand and the polymerization reaction terminated when ethylene flow into the reactor ceased. Run times for each polymerization reaction are provided in the Tables.

The abbreviations for the catalyst systems used are as follows:

[(iPr$_2$Ph)$_2$DABMe$_2$]Ni(acac)$_2$-N,N'-bis(2,6-diisopropylphenyl)-2,3-butanediimine nickel(II) bis(acetylacetonate)

[(iPr$_2$Ph)$_2$DABMe$_2$]Ni(hfacac)$_2$-N,N'-bis(2,6-diisopropylphenyl)-2,3-butanediimine nickel(II) bis(1,1,1,5,5,5-hexafluoroacetylacetonate)

[(iPr$_2$Ph)$_2$DABMe$_2$]Ni(hfacac)Cl-N,N'-bis(2,6-diisopropylphenyl)-2,3-butanediimine nickel(II) (1,1,1,5,5,5-hexafluoroacetylacetonate)chloride

[(iPr$_2$Ph)$_2$DABMe$_2$]Ni(allOacac)$_2$-N,N'-bis(2,6-diisopropylphenyl)-2,3-butanediimine bis(allylacetylacetonato) nickel (II)

[(iPr$_2$Ph)$_2$DABMe$_2$]Ni(Phacac)$_2$-N,N'-bis(2,6-diisopropylphenyl)-2,3-butanediimine nickel(II) bis(benzoylacetonate)

[(iPr$_2$Ph)$_2$DABMe$_2$]Ni(PhCF$_3$acac)$_2$-N,N'-bis(2,6-diisopropylphenyl)-2,3-butanediimine nickel(II) bis(benzoyl-1,1,1-trifluoroacetonate)

[(iPr$_2$Ph)$_2$DABMe$_2$]Ni(CF$_3$acac)$_2$-N,N'-bis(2,6-diisopropylphenyl)-2,3-butanediimine nickel(II) bis(1,1,1-trifluoroacetylacetonate)

[(iPr$_2$Ph)$_2$DABMe$_2$]Ni(CClF$_2$acac)$_2$-N,N'-bis(2,6-diisopropylphenyl)-2,3-butanediimine nickel(II) bis(1-chloro-1,1-difluoroacetylacetonate)

[(iPr$_2$Ph)$_2$DABMe$_2$]Ni(CF$_3$MeOacac)$_2$-N,N'-bis(2,6-diisopropylphenyl)-2,3-butanediimine bis(methyltrifluoroacetoacetonato) nickel(II)

[(iPr$_2$Ph)$_2$DABMe$_2$]Ni(CF$_3$tBuacac)$_2$-N,N'-bis(2,6-diisopropylphenyl)-2,3-butanediimine nickel(II) bis(1,1,1-trifluoro-5,5-dimethylacetylacetonate)

[(iPr$_2$Ph)$_2$DABMe$_2$]Ni(CF$_3$OEt-α-Meacac)$_2$-N,N'-bis(2,6-diisopropylphenyl)-2,3-butanediimine bis(ethyl α-methyl-4,4,4-trifluoroacetoacetato) nickel(II)

[(iPr$_2$Ph)$_2$DABMe$_2$]Ni(CF$_3$furacac)$_2$-N,N'-bis(2,6-diisopropylphenyl)-2,3-butanediimine nickel(II) bis(4,4,4-trifluoro-1-(2-furyl)acetylacetonate)

[(iPr$_2$Ph)$_2$DABMe$_2$]Ni(CF$_3$CF$_2$CF$_2$tBuacac)$_2$-N,N'-bis(2,6-diisopropylphenyl)-2,3-butanediimine nickel(II) bis(2,2-dimethyl-6,6,7,7,8,8,8-heptafluoro-3,5-octanedionate)

[(iPr$_2$Ph)$_2$DABAn]Ni(hfacac)$_2$-N,N'-bis(2,6-diisopropylphenyl)acenaphthyl nickel(II) bis(hexafluoroacetylacetonate)

[(Me$_2$Ph)$_2$DABH$_2$]Ni(acac)$_2$-N,N'-bis(2,6-dimethylphenyl)-2,3-ethylenediimine nickel(II) bis(acetylacetonate)

[(Me$_2$Ph)$_2$DABMe$_2$]Ni(acac)$_2$-N,N'-bis(2,6-dimethylphenyl)-2,3-butanediimine nickel(II) bis(acetylacetonate).

In general, catalyst systems used for polymerization in the Examples were prepared as described in this application.

Mass Catalyst (grams) is the mass of catalyst system charged to the polymerization reactor for each Run. Polymer density was determined in grams per cubic centimeter (g/cc) on a compression molded sample, cooled at about 15° C. per hour, and conditioned for about 40 hours at room temperature in accordance with ASTM D1505 and ASTM D1928, procedure C. High load melt index (HLMI, g/10 mins) was determined in accordance with ASTM D1238 at 190° C. with a 21,600 gram weight. Melt index (MI, g/10 mins) was determined in accordance with ASTM D1238 at 190° C. with a 2,160 gram weight. Size exclusion chromatography (SEC) analyses were performed at 140° C. on a Waters, model 150 GPC with a refractive index detector. A solution concentration of 0.17 to 0.65 weight percent in 1,2,4-trichlorobenzene was found to give reasonable elution times. Reported weight average molecular weight ($M_w$) and number average molecular weight ($M_n$) values (results) need to be multiplied by a factor of 1000 for the actual value. Reported Al:Ni ratio values are expressed as molar ratio values. Values that were not determined are represented as "ND" in the Tables.

Example 1

This example shows that high catalyst system productivity can be achieved by substituting one or both of the halide ligands of a diimine nickel dihalide complex with a β-diketonate or β-ketoester ligand.

Polymerizations in the following Runs were carried out as described above, with a reactor pressure of 550 psig ethylene in isobutane slurry at 40° C. MAO was added in a 10% wt/wt solution in toluene. Polymerization results are listed below in Table 1.

TABLE 1

| Run # | Catalyst | Mass cat. (g) | Run Time (mins.) | Productivity (g PE/g Ni) | MI | HLMI | Density (g/cc) | Al:Ni |
|---|---|---|---|---|---|---|---|---|
| 101 | [(iPr$_2$Ph$_2$)DABMe$_2$]NiBr$_2$ | 0.0218 | 13 | 490 | ND | ND | ND | 240 |
| 102 | [(iPr$_2$Ph$_2$)DABMe$_2$]Ni(CF$_3$CF$_2$CF$_2$tBuacac)$_2$ | 0.0583 | 4 | 7310 | 0 | 0 | 0.9196 | 150 |
| 103 | [(iPr$_2$Ph$_2$)DABMe$_2$]NiCl$_2$ | 0.0200 | 9 | 11400 | 0 | 0 | 0.9099 | 230 |
| 104 | [(iPr$_2$Ph$_2$)DABMe$_2$]Ni(hfacac)$_2$ | 0.0050 | 4 | 12000 | ND | ND | ND | 1200 |
| 105 | [(iPr$_2$Ph$_2$)DABMe$_2$]NiCl$_2$ | 0.0230 | 30 | 13400 | 0 | 0 | 0.9081 | 200 |
| 106 | [(iPr$_2$Ph$_2$)DABMe$_2$]Ni(CF$_3$OEt-α-Meacac)$_2$ | 0.0163 | 21 | 13900 | 0 | 0 | 0.9074 | 450 |
| 107 | [(iPr$_2$Ph$_2$)DABMe$_2$]Ni(Phacac)$_2$ | 0.0109 | 18 | 17100 | ND | ND | 0.9212 | 610 |
| 108 | [(iPr$_2$Ph$_2$)DABMe$_2$]Ni(allOacac)$_2$ | 0.0209 | 27 | 21300 | 0 | 0 | 0.9157 | 300 |
| 109 | [(iPr$_2$Ph$_2$)DABMe$_2$]Ni(CF$_3$acac)$_2$ | 0.0020 | 8 | 29500 | 0 | 0 | ND | 3300 |
| 110 | [(iPr$_2$Ph$_2$)DABMe$_2$]Ni(CF$_3$furacac)$_2$ | 0.0121 | 17 | 30700 | 0 | 0 | 0.8961 | 610 |
| 111 | [(iPr$_2$Ph$_2$)DABMe$_2$]Ni(PhCF$_3$acac)$_2$ | 0.0165 | 41 | 33700 | 0 | 0 | 0.9137 | 460 |
| 112 | [(iPr$_2$Ph$_2$)DABMe$_2$]Ni(hfacac)$_2$ | 0.0111 | 3 | 35000 | 0 | 0 | 0.8819 | 670 |
| 113 | [(iPr$_2$Ph$_2$)DABMe$_2$]Ni(CClF$_2$acac)$_2$ | 0.0118 | 10 | 96200 | 0 | 0 | 0.8857 | 580 |
| 114 | [(iPr$_2$Ph$_2$)DABMe$_2$]Ni(hfacac)$_2$ | 0.0195 | 15 | 108000 | 0 | 0 | 0.8926 | ND |
| 115 | [(iPr$_2$Ph$_2$)DABMe$_2$]Ni(tBuCF$_3$acac)$_2$ | 0.0114 | 17 | 139000 | ND | ND | 0.8918 | 640 |
| 116 | [(iPr$_2$Ph$_2$)DABMe$_2$]Ni(CF$_3$acac)$_2$ | 0.0041 | 60 | 157000 | 0 | 0 | 0.8955 | 1600 |
| 117 | [(iPr$_2$Ph$_2$)DABMe$_2$]Ni(hfacac)$_2$ | 0.0092 | 18 | 174000 | 0 | 0 | 0.8888 | 810 |
| 118 | [(iPr$_2$Ph$_2$)DABMe$_2$]Ni(hfacac)Cl | 0.0062 | 27 | 198000 | 0 | 0 | 0.8871 | 1000 |
| 119 | [(iPr$_2$Ph$_2$)DABMe$_2$]Ni(hfacac)$_2$ | 0.0052 | 31 | 293000 | 0 | 0 | 0.9100 | 860 |
| 120 | [(iPr$_2$Ph$_2$)DABMe$_2$]Ni(hfacac)$_2$ | 0.0100 | 31 | 327000 | 0 | 0 | 0.9087 | 750 |
| 121 | [(iPr$_2$Ph$_2$)DABMe$_2$]Ni(hfacac)$_2$ | 0.0025 | 14 | 378000 | 0 | 0 | 0.9017 | 600 |
| 122 | [(iPr$_2$Ph$_2$)DABMe$_2$]Ni(hfacac)$_2$ | 0.0040 | 35 | 493000 | 0 | 0 | 0.9111 | 750 |
| 123 | [(iPr$_2$Ph$_2$)DABMe$_2$]Ni(hfacac)$_2$ | 0.0052 | 31 | 621000 | 0 | 0 | 0.88531 | 14001 |

The data in Table 1 show that diimine nickel(II) catalyst systems containing β-diketonate or β-ketoester ligands can effectively polymerize ethylene with higher productivity than catalysts containing exclusively diimine and halide ligands (see Runs 101, 103 and 105). The data also show that the addition of a single β-diketonate ligand affords much higher productivity. Also note that reactor temperatures are within commercially acceptable ranges, i.e., between 40 and 80° C.

Example 2

This example shows that process conditions can be changed without losing the high productivity attained by one, or both of the halide ligands of a diimine nickel dihalide complex with a β-diketonate or β-ketoester ligand. Again, all of the following polymerizations were carried out as described above, with a reactor pressure of 550 psig ethylene in isobutane slurry. MAO was added in a 10% wt/wt solution in toluene. Process conditions were varied by changing the polymerization temperature and, as a result, the quantity of dissolved ethylene in the reaction medium. The structure of the diimine ligand was also varied. Polymerization catalyst systems and results are listed below at temperatures of 27, 60, and 80° C. in Tables 2, 3, and 4, respectively.

TABLE 2

(all Runs were at 27° C.)

| Run # | Catalyst | Mass cat. (g) | Run Time (mins.) | Productivity (g PE/g Ni) | MI | HLMI | Density (g/cc) | Al:N | Mn | Mw | HI |
|---|---|---|---|---|---|---|---|---|---|---|---|
| 201 | [(iPr$_2$Ph$_2$)DABMe$_2$]NiBr$_2$ | 0.0340 | 15 | 940 | ND | ND | 0.9450 | 160 | ND | ND | ND |
| 202 | [(iPr$_2$Ph$_2$)DABAn]NiBr$_2$ | 0.0303 | 25 | 1210 | ND | ND | 0.9564 | 200 | ND | ND | ND |
| 203 | [(iPr$_2$Ph$_2$)DABMe$_2$]NiCl$_2$ | 0.0231 | 24 | 1580 | ND | ND | ND | 200 | ND | ND | ND |
| 204 | [(Me$_2$Ph$_2$)DABMe$_2$]NiBr$_2$ | 0.0301 | 17 | 2020 | 0 | 0.05 | 0.9496 | 140 | 239 | 531 | 2.22 |
| 205 | [(Me$_2$Ph$_2$)DABH$_2$]NiBr$_2$ | 0.0294 | 24 | 2510 | 1.4 | 84 | 0.9749 | 140 | 20 | 74 | 3.64 |
| 206 | [(iPr$_2$Ph$_2$)DABAn$_2$]NiCl$_2$ | 0.0343 | 31 | 4080 | 0 | 0 | 0.9421 | 160 | 399 | 1059 | 2.65 |
| 207 | [(Me$_2$Ph$_2$)DABH$_2$]NiCl$_2$ | 0.0233 | 31 | 4950 | 0.46 | 38 | 0.9691 | 140 | ND | ND | ND |
| 208 | [(iPr$_2$Ph$_2$)DABMe$_2$]NiCl$_2$ | 0.0176 | 41 | 26900 | 0 | 0 | 0.9175 | 260 | ND | ND | ND |
| 209 | [(Me$_2$Ph$_2$)DABMe$_2$]NiCl$_2$ | 0.0413 | 60 | 27900 | 0 | 0.07 | 0.9457 | 87 | 95 | 373 | 3.92 |
| 210 | [(Me$_2$Ph$_2$)DABH$_2$]Ni(acac)$_2$ | 0.0362 | 30 | 29000 | 0 | 0.45 | 0.9305 | 120 | ND | ND | ND |
| 211 | [(Me$_2$Ph$_2$)DABH$_2$]Ni(acac)$_2$ | 0.0021 | 9 | 42300 | 0 | 0.07 | 0.9383 | 420 | ND | ND | ND |
| 212 | [(iPr$_2$Ph$_2$)DABMe$_2$]NiCl$_2$ | 0.0309 | 74 | 57700 | 0 | 0 | 0.9132 | 150 | 1038 | 2638 | 2.54 |
| 213 | [(Me$_2$Ph$_2$)DABH$_2$]Ni(acac)$_2$ | 0.0139 | 14 | 78000 | 0 | 0.15 | 0.9180 | 320 | ND | ND | ND |
| 214 | [(Me$_2$Ph$_2$)DABMe$_2$]Ni(acac)$_2$ | 0.0147 | 18 | 78800 | 0 | 0.33 | 0.9331 | 320 | ND | ND | ND |
| 215 | [(Me$_2$Ph$_2$)DABMe$_2$]Ni(acac)$_2$ | 0.0090 | 14 | 82100 | ND | ND | ND | 520 | ND | ND | ND |
| 216 | [(iPr$_2$Ph$_2$)DABAn]Ni(hfacac) | 0.0142 | 25 | 96900 | 0 | 0 | 0.9205 | 580 | 420 | 1425 | 3.4 |
| 217 | [(Me$_2$Ph$_2$)DABH$_2$]Ni(hfacac) | 0.0100 | 9 | 138000 | 5.6 | 215 | 0.9450 | 630 | ND | ND | ND |
| 218 | [(iPr$_2$Ph$_2$)DABMe$_2$]Ni(hfacac) | 0.0204 | 30 | 149000 | 0 | 0 | 0.8951 | 370 | 516 | 1687 | 3.27 |
| 219 | [(iPr$_2$Ph$_2$)DABMe$_2$]Ni(hfacac) | 0.0134 | 35 | 199000 | 0 | 0 | 0.9002 | 450 | 360 | 1523 | 4.23 |

TABLE 3

(all Runs were at 60° C.

| Run # | Catalyst | Mass cat. (g) | Run Time (mins.) | Productivity (g PE/g Ni) | MI | HLMI | Density (g/cc) | Al:Ni | Mn | Mw | HI |
|---|---|---|---|---|---|---|---|---|---|---|---|
| 301 | [(Me₂Ph₂)DABH₂]Ni(acac)₂ | 0.0161 | 6 | 1580 | ND | ND | ND | 280 | ND | ND | ND |
| 302 | [(Me₂Ph₂)DABH₂]NiCl₂ | 0.0229 | 1 | 3810 | 1.7 | 112 | 0.9618 | 150 | 17 | 84 | 4.91 |
| 303 | [(Me₂Ph₂)DABMe₂]NiCl₂ | 0.0545 | 16 | 4710 | 0.21 | 22 | 0.9056 | 26 | 33 | 94 | 2.82 |
| 304 | [(Me₂Ph₂)DABH₂]NiCl₂ | 0.0274 | 8 | 5130 | 2.5 | 126 | 0.9546 | 73 | 16 | 73 | 4.46 |
| 305 | [(Me₂Ph₂)DABH₂]NiCl₂ | 0.0233 | 8 | 5470 | 2.6 | 127 | 0.9530 | 58 | ND | ND | ND |
| 306 | [(iPr₂Ph₂)DABAn]NiBr₂ | 0.0483 | 22 | 8660 | 0 | 0.11 | 0.8963 | 130 | 143 | 550 | 3.86 |
| 307 | [(iPr₂Ph₂)DABAn]NiCl₂ | 0.0283 | 11 | 8740 | 0 | 0 | 0.8957 | 190 | 220 | 808 | 3.68 |
| 308 | [(iPr₂Ph₂)DABMe₂]NiBr₂ | 0.0188 | 15 | 10200 | 0 | 0 | 0.8753 | 280 | 632 | 1725 | 2.73 |
| 309 | [(Me₂Ph₂)DABMe₂]NiBr₂ | 0.0283 | 11 | 10400 | 0.26 | 16 | 0.9095 | 150 | 38 | 110 | 2.92 |
| 310 | [(Me₂Ph₂)DABH₂]Ni(acac)₂ | 0.0085 | 6 | 10600 | ND | ND | ND | 520 | ND | ND | ND |
| 311 | [(Me₂Ph₂)DABH₂]NiBr₂ | 0.0312 | 9 | 12600 | 4.4 | 169 | 0.9527 | 130 | 15 | 86 | 5.93 |
| 312 | [(Me₂Ph₂)DABMe₂]NiCl₂ | 0.0328 | 5 | 13100 | 0.03 | 5.5 | 0.9107 | 110 | 53 | 164 | 3.10 |
| 313 | [(Me₂Ph₂)DABMe₂]Ni(acac)₂ | 0.0313 | 7 | 17000 | ND | ND | ND | 150 | ND | ND | ND |
| 314 | [(iPr₂Ph₂)DABMe₂]NiCl₂ | 0.0202 | 7 | 17100 | 0 | 0 | 0.8817 | 220 | 390 | 1228 | 3.15 |
| 315 | [(Me₂Ph₂)DABMe₂]Ni(acac)₂ | 0.0158 | 5 | 18400 | 0.02 | 3.0 | 0.9215 | 300 | ND | ND | ND |
| 316 | [(iPr₂Ph₂)DABMe₂]NiCl₂ | 0.0185 | 17 | 52100 | 0 | 0 | 0.8805 | 250 | ND | ND | ND |
| 317 | [(iPr₂Ph₂)DABAn₂]Ni(hfacac)₂ | 0.0048 | 16 | 104000 | 0 | 0.08 | 0.9011 | 1700 | 309 | 1366 | 4.4 |
| 318 | [(iPr₂Ph₂)DABMe₂]Ni(hfacac)₂ | 0.0088 | 19 | 116000 | 0 | 0 | 0.8867 | 680 | ND | ND | ND |
| 319 | [(Me₂Ph₂)DABH₂]Ni(hfacac)₂ | 0.0034 | 4 | 137000 | 1.3 | 78 | 0.9569 | 1850 | ND | ND | ND |
| 320 | [(iPr₂Ph₂)DABMe₂]Ni(hfacac)₂ | 0.0029 | 14 | 302000 | 0 | 0 | 0.8986 | 2600 | 788 | 2389 | 3.0 |

TABLE 4

(all Runs were at 80° C.

| Run # | Catalyst | Mass cat. (g) | Run Time (mins) | Productivity (gPE/gNi) | MI | HLMI | Density (g/cc) | Al:Ni | Mn | Mw | HI |
|---|---|---|---|---|---|---|---|---|---|---|---|
| 401 | [(iPr₂Ph₂)DABAn]NiCl₂ | 0.0326 | 9 | 1980 | ND | ND | 0.9048 | 160 | ND | ND | ND |
| 402 | [(Me₂Ph₂)DABH₂]Ni(acac)₂ | 0.0161 | 3 | 3860 | 0.46 | 24 | 0.9246 | 280 | ND | ND | ND |
| 403 | [(iPr₂Ph₂)DABAn]NiBr₂ | 0.0239 | 5 | 4580 | 0 | 1.5 | 0.8644 | 260 | ND | ND | ND |
| 404 | [(Me₂Ph₂)DABH₂]NiBr₂ | 0.0318 | 6 | 5160 | 16 | ND | 0.9466 | 130 | 12 | 44 | 3.62 |
| 405 | [(Me₂Ph₂)DABMe₂]Ni(acac)₂ | 0.0253 | 3 | 6650 | 1.5 | 67 | 0.9118 | 180 | ND | ND | ND |
| 406 | [(iPr₂Ph₂)DABMe₂]NiBr₂ | 0.0363 | 5 | 6740 | 0 | 0 | 0.8680 | 150 | 255 | 652 | 2.56 |
| 407 | [(Me₂Ph₂)DABMe₂]Ni(acac)₂ | 0.0131 | 4 | 7140 | ND | ND | ND | 360 | ND | ND | ND |
| 408 | [(Me₂Ph₂)DABMe₂]NiBr₂ | 0.0263 | 9 | 9920 | 72 | ND | ND | 160 | 14 | 31 | 2.22 |
| 409 | [(Me₂Ph₂)DABH₂]Ni(hfacac)₂ | 0.0035 | 2 | 10800 | ND | ND | 0.9997 | 1800 | ND | ND | ND |
| 410 | [(iPr₂Ph₂)DABAn₂]Ni(hfacac)₂ | 0.0202 | 4 | 24600 | 0 | 0.12 | 0.8899 | 410 | 145 | 644 | 4.4 |
| 411 | [(iPr₂Ph₂)DABMe₂]Ni(hfacac)Cl | 0.0088 | 4 | 25700 | 0 | 0.04 | 0.8867 | 680 | ND | ND | ND |
| 412 | [(iPr₂Ph₂)DABMe₂]Ni(hfacac)₂ | 0.0059 | 4 | 83600 | 0 | 0 | 0.8912 | 1300 | 394 | 171 | 4.3 |

The results in Tables 2, 3, and 4 show that the high productivity seen with nickel diimine complexes containing one or two β-diketonate or β-ketoester ligands is maintained when temperature (and therefore dissolved ethylene concentration as well) and the diimine ligand are changed. Again, note that reactor temperatures were within commercially acceptable ranges, i.e., between 40 and 80° C.

Example 3

This example shows that the high productivity seen with diimine nickel complexes containing one or two β-ketoester ligands is maintained at low Al:Ni ratios; i.e., low levels of MAO. Again, all of the following polymerizations were carried out as described above, with a reactor pressure of 550 psig ethylene in isobutane slurry. MAO was added in a 10% wt/wt solution in toluene. Catalyst system used in Runs 523–527 were physically mixed with an inert, filler material before addition to the reactor in order to expedite weighing small amounts of catalyst system. Then, the actual mass of catalyst system added to the reactor was calculated, based on the weight ratio of filler and catalyst system combined.

TABLE 5

| Run # | Catalyst | Mass cat. (g) | T (° C.) | Run Time (mins) | Productivity (g PE/g Ni) | MI | HLMI | Density (g/cc) | Al:Ni |
|---|---|---|---|---|---|---|---|---|---|
| 501 | [(Me₂Ph₂)DABH₂]Ni(acac)₂ | 0.0110 | 13 | 9 | 87200 | 0 | 0.19 | 0.9348 | 160 |
| 502 | [(Me₂Ph₂)DABH₂]Ni(acac)₂ | 0.0362 | 27 | 11 | 29000 | 0 | 0.45 | 0.930 | 120 |
| 503 | [(Me₂Ph₂)DABMe₂]Ni(acac)₂ | 0.0147 | 27 | 17 | 78800 | 0 | 0.33 | 0.9331 | 320 |

TABLE 5-continued

| Run # | Catalyst | Mass cat. (g) | T (° C.) | Run Time (mins) | Productivity (g PE/g Ni) | MI | HLMI | Density (g/cc) | Al:Ni |
|---|---|---|---|---|---|---|---|---|---|
| 504 | [(Me$_2$Ph$_2$)DABH$_2$]Ni(acac)$_2$ | 0.0139 | 27 | 10 | 78000 | 0 | 0.15 | 0.9180 | 320 |
| 505 | [(iPr$_2$Ph$_2$)DABMe$_2$]Ni(hfacac)$_2$ | 0.0204 | 27 | 30 | 149000 | 0 | 0 | 0.8951 | 370 |
| 506 | [(iPr$_2$Ph$_2$)DABMe$_2$]Ni(hfacac)Cl | 0.0134 | 27 | 35 | 199000 | 0 | 0 | 0.9002 | 450 |
| 507 | [(Me$_2$Ph$_2$)DABMe$_2$]Ni(acac)$_2$ | 0.0090 | 27 | 14 | 82100 | ND | ND | ND | 520 |
| 508 | [(Me$_2$Ph$_2$)DABH$_2$]Ni(acac)$_2$ | 0.0448 | 40 | 7 | 28500 | 0 | 0.34 | 0.9221 | 100 |
| 509 | [(Me$_2$Ph$_2$)DABH$_2$]Ni(hfacac)$_2$ | 0.0050 | 40 | 5 | 52700 | 1.5 | 51 | 0.9608 | 250 |
| 510 | [(Me$_2$Ph$_2$)DABH$_2$]Ni(acac)$_2$ | 0.0185 | 40 | 10 | 51800 | 0 | 0.12 | 0.9360 | 250 |
| 511 | [(iPr$_2$Ph$_2$)DABMe$_2$]Ni(allOacac)$_2$ | 0.0209 | 40 | 27 | 21300 | 0 | 0 | 0.9157 | 300 |
| 512 | [(iPr$_2$Ph$_2$)DABMe$_2$]Ni(PhCF$_3$acac)$_2$ | 0.0165 | 40 | 41 | 33700 | 0 | 0 | 0.9137 | 460 |
| 513 | [(iPr$_2$Ph$_2$)DABMe$_2$]Ni(CF$_3$CF$_2$CF$_2$tBuacac)$_2$ | 0.0608 | 60 | 7 | 4430 | 0 | 0 | <0.8800 | 150 |
| 514 | [(Me$_2$Ph$_2$)DABMe$_2$]Ni(acac)$_2$ | 0.0313 | 60 | 7 | 17000 | ND | ND | ND | 150 |
| 515 | [(Me$_2$Ph$_2$)DABMe$_2$]Ni(acac)$_2$ | 0.0158 | 60 | 5 | 18400 | 0.02 | 3.0 | 0.9215 | 300 |
| 516 | [(iPr$_2$Ph$_2$)DABMe$_2$]Ni(allOacac)$_2$ | 0.0177 | 60 | 4 | 6450 | 0 | 0 | 0.9060 | 360 |
| 517 | [(Me$_2$Ph$_2$)DABMe$_2$]Ni(acac)$_2$ | 0.0253 | 80 | 3 | 6650 | 1.5 | 67 | 0.9118 | 180 |
| 518 | [(iPr$_2$Ph$_2$)DABMe$_2$]Ni(CF$_3$furacac)$_2$ | 0.0310 | 80 | 6 | 8600 | 0 | 0.08 | 0.8836 | 240 |
| 519 | [(Me$_2$Ph$_2$)DABH$_2$]Ni(acac)$_2$ | 0.0161 | 80 | 3 | 3900 | 0.46 | 24 | 0.9246 | 280 |
| 520 | [(iPr$_2$Ph$_2$)DABMe$_2$]Ni(PhCF$_3$acac)$_2$ | 0.0216 | 80 | 4 | 12000 | 0 | 0.04 | 0.9013 | 350 |
| 521 | [(Me$_2$Ph$_2$)DABMe$_2$]Ni(acac)$_2$ | 0.0131 | 80 | 4 | 7140 | ND | ND | ND | 360 |
| 522 | [(iPr$_2$Ph$_2$)DABAn]Ni(hfacac)$_2$ | 0.0202 | 80 | 4 | 24600 | 0 | 0.12 | 0.8899 | 410 |
| 523 | [(iPr$_2$Ph$_2$)DABMe$_2$]Ni(hfacac)$_2$ | 0.0038 | 40 | 16 | 116000 | ND | ND | ND | 1590 |
| 524 | [(iPr$_2$Ph$_2$)DABMe$_2$]Ni(hfacac)$_2$ | 0.0054 | 40 | 10 | 53000 | ND | ND | ND | 830 |
| 525 | [(iPr$_2$Ph$_2$)DABMe$_2$]Ni(hfacac)$_2$ | 0.0046 | 40 | 20 | 169000 | ND | ND | ND | 660 |
| 526 | [(iPr$_2$Ph$_2$)DABMe$_2$]Ni(hfacac)$_2$ | 0.0044 | 40 | 47 | 104000 | ND | ND | ND | 340 |
| 527 | [(iPr$_2$Ph$_2$)DABMe$_2$]Ni(hfacac)$_2$ | 0.0052 | 40 | 28 | 99000 | ND | ND | ND | 140 |

The data in Table 5 show that high productivity can be achieved with diimine nickel complexes containing one or two β-diketonate or β-ketoester groups with low levels of MAO. Runs 523–527 clearly demonstrate that very high productivities can be achieved even at very low Al:Ni molar ratios, i.e., low amounts of MAO added to the polymerization reaction.

Example 4

This Example shows that inventive catalyst systems can be used to produce syndiotactic polymers. The term "syndiotactic polymer", as used herein, includes those polymers having segments of more than 10 monomeric units in which the alkyl groups of each successive monomeric unit is on the opposite side of the plane of the polymer. Syndiotactic polymers produced according to the invention can have a wide range of applications based upon their physical properties. These syndiotactic polymers can be molded by heat to form shaped objects and they can be used to form fibers or filaments. These syndiotactic polymers also can be used for blending with polymers of different tacticity to vary the properties of such polymers.

In this example where information is given about the microstructure of polymers as determined by $^{13}$CNMR, spectra were taken using standard accepted spectroscopy techniques. Polymer was dissolved in 1,2,4-trichlorobenzene and the spectra was taken with respect to an internal standard relative to hexamethylsiloxane which has a known reference point relative to tetramethylsilane; the base standard in the NMR spectra was 0 ppm based on tetramethylsilane. From the observed integrals of the relevant peaks, the details regarding the microstructure are calculated.

Meso Content=(mm)+½ (mr)
Racemic Content=(rr)+½ (mr)
Isotacticity % (mm)
Heteroactivity=% (mr)
Syndiatacticity=% (rr)

$$\text{Randomness Index} = \frac{(mr)\,100}{2(m)(r)}$$

$$\text{Average Isotactic Block Length} = 1 + \frac{2(mm)}{(mr)}$$

$$\text{Average Syndiotactic Block Length} = 1 + \frac{2(rr)}{(Mr)}$$

For more detail regarding the determination of these values, reference can be made to Chapter 3 of *Chain Structure and Conformation of Macromolecules* (Academic Press, 1982) by Frank A. Bovey.

Polymerization was carried out as described above. Reactor temperature was 80° C. 0.0140 g of N,N'-bis(2,6-diisopropylphenyl)-2,3-butanediimine nickel(II) bis (acetylacetonate), designated as [(iPr$_2$Ph)$_2$DABMe$_2$]Ni (acac)$_2$ the nickel catalyst system and 5 mls of MAO (10 weight % in toluene) were added to the reactor, followed by propylene. Propylene was fed on demand and the polymerization reaction terminated when propylene flow into the reactor ceased. Hydrogen was not added to the reactor. After one hour of reaction time, isobutane was removed to yield 4.2 g of polymer. Productivity was 2660 g polypropylene/g Ni. Polymer characterization by $^{13}$CNMR is as follows.

%[mm]=6.00%[m]=17.1
%[mr]=22.17%[r]=7.48
%[rr]=71.83

The above data demonstrates that the inventive catalyst systems can produce syndiotactic polymers, such as syndiotactic polypropylene, as shown by approximately 72% rr triads as determined by $^{13}$CNMR spectroscopy.

While this invention has been described in detail for the purpose of illustration, it is not to be construed as limited thereby but is intended to cover all changes and modifications within the spirit and scope thereof.

That which is claimed:
1. A catalyst composition comprising:
a) diimine nickel complexes having a formula selected from:

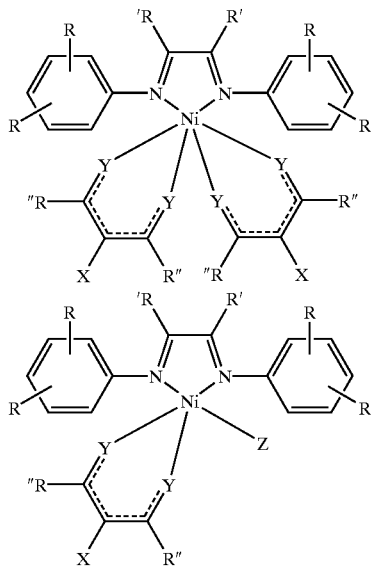

wherein R can be the same or different and is a branched or linear alkyl or aromatic groups having from 1 to about 10 carbon atoms per alkyl group and can be in any position on the aromatic ring;
wherein R' can be the same or different and is hydrogen or a linear, branched, cyclic, bridging, aromatic, or aliphatic hydrocarbons, having from 1 to about 70 carbon atoms per radical group;
wherein R"CYCXCYR" can be the same or different and is selected from α-deprotonated-β-diketones, α-deprotonated-β-ketoesters, or mixtures thereof, and wherein R" and X can be the same or different and are individually selected from hydrogen; linear, branched, cyclic, bridging, aromatic, or aliphatic hydrocarbons; or mixtures thereof having from 1 to about 70 carbon atoms per radical group, optionally containing atoms other than carbon and hydrogen;
wherein Y can be the same or different and is selected from oxygen, sulfur, or selenium; and
wherein Z is a halogen selected from fluorine, chlorine, bromine, or iodine and
b) methylaluminoxane.

2. A composition according to claim 1 wherein said R substituent is selected from linear or branched aliphatic groups having from about 1 to about 8 carbon atoms per group.

3. A composition according to claim 2 wherein said R substituent is selected from methyl groups, isopropyl groups, or mixtures thereof.

4. A composition according to claim 1 wherein said R' substituent is selected from hydrogen and branched, linear, cyclic, aromatic or aliphatic hydrocarbon radicals having from about 1 to about 12 carbon atoms per radical.

5. A composition according to claim 4 wherein said R' substituent is selected from hydrogen, methyl groups, ethyl groups, propyl groups, phenyl groups, acenaphthyl groups, cyclobutadienyl groups or mixtures thereof.

6. A composition according to claim 1 wherein one said R" and X are selected from hydrogen and linear, branched, cyclic, bridging, aromatic, aliphatic hydrocarbon radicals, or mixtures thereof having from about 1 to about 70 carbon atoms per radical group, optionally containing atoms other than carbon and hydrogen and wherein the other said R" is selected from alkoxides of linear, branched, cyclic, bridging, aromatic, and aliphatic hydrocarbon radicals, or mixtures thereof having from about 1 to about 70 carbon atoms per radical group, optionally containing atoms other than carbon and hydrogen; and
Z is selected from fluorine, chlorine, bromine, or iodine.

7. A composition according to claim 6 wherein said R"CYCXCYR" is selected from 2,4-pentanedione, 1,1,1,5,5,5-hexafluoro-2,4-pentanedione, allylacetonacetate, benzoylacetonate, benzoyl-1,1,1-trifluoroacetone, 1,1,1-trifluoro-2,4-pentanedione, 1-chloro-1,1-difluoroacetylacetone methyl-4,4,4 trifluoroacetoacetate, 1,1,1-trifluoro-5,5-dimethyl-2,4-pentanedione, ethyl alpha-methyl-4,4,4-trifluoroacetoacetate, 4,4,4-trifluoro-1-(2-furyl)-1,3-butanedione, 2,2-dimethyl 6,6,7,7,8,8,8-heptafluro-3,5-octanedione, or mixtures thereof; and
Z is selected from chloride or bromide.

8. A composition according to claim 1 wherein said diimine nickel complexes and said methylaluminoxane are present in an amount to have an aluminum to nickel molar ratio of less than about 850:1.

9. A composition according to claim 1 wherein said aluminum to nickel molar ratio is within a range of about 50:1 to about 600:1.

10. A catalyst composition comprising at least one mono-1-olefin under particle form polymerization conditions with a catalyst composition comprising methylaluminoxane and at least one diimine complex selected from nickel and palladiium diimine complexes of the group having (1) one ligand selected from α-deprotonated-β-diketone and α-deprotonated-β-ketoesters and another selected from halides and (2) two ligands which are the same or different which are selected from α-deprotonated-β-diketone and α-deprotonated-β-ketoesters, at least one of which has a fluorine-containing substituent.

11. A composition according to claim 10 wherein said diimine complex is a nickel that has two 1,1,1,5,5,5,-hexafluoroacetylacetonate ligands.

12. A composition according to claim 11 wherein the diimine portion of the diimine complex is N,N'-bis(2,6,diisopropylphenyl)-2,3-butane.

13. A composition according to claim 11 wherein the diimine portion of the diimine complex is N,N'-bis(2,6,diimethylphenyl)-2,3-butane.

14. A composition according to claim 10 wherein the diimine complex is a nickel complex and the diimine portion of the diimine complex is N,N'-bis(2,6,diisopropylphenyl)-2,3-butane.

15. A composition according to claim 14 wherein the nickel complex has one halide ligand and one ligand selected from α-deprotonated-β-ketoesters, at least one of which has a fluorine-containing substituent.

16. A composition according to claim 15 wherein the nickel complex has a chloride ligand and a 1,1,1,5,5,5,-hexafluoroacetylacetonate ligand.

17. A composition according to claim 10 wherein the diimine complex is a nickel complex and the diimine portion of the diimine complex is N,N'-bis(2,6-diisopropylphenyl) acenaphthyl.

* * * * *